(12) United States Patent
Tateishi

(10) Patent No.: US 9,164,180 B2
(45) Date of Patent: Oct. 20, 2015

(54) ELECTRONIC CASSETTE

(71) Applicant: FUJIFILM Corporation, Tokyo (JP)

(72) Inventor: Masateru Tateishi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 77 days.

(21) Appl. No.: 13/919,050

(22) Filed: Jun. 17, 2013

(65) Prior Publication Data

US 2014/0016757 A1   Jan. 16, 2014

(30) Foreign Application Priority Data

Jul. 12, 2012   (JP) ................................ 2012-156378

(51) Int. Cl.
*G01T 1/16* (2006.01)
*G01T 1/20* (2006.01)

(52) U.S. Cl.
CPC .... *G01T 1/16* (2013.01); *G01T 1/20* (2013.01)

(58) Field of Classification Search
CPC ..................................................... G03B 42/04
USPC .................. 378/189, 169, 172, 176, 182, 188
See application file for complete search history.

(56) References Cited

U.S. PATENT DOCUMENTS

| | | | |
|---|---|---|---|
| 2006/0171507 A1* | 8/2006 | Watanabe et al. | 378/189 |
| 2008/0078940 A1 | 4/2008 | Castleberry et al. | |
| 2009/0014659 A1* | 1/2009 | Hennessy et al. | 250/370.09 |
| 2010/0327737 A1* | 12/2010 | Hayashi et al. | 313/504 |

FOREIGN PATENT DOCUMENTS

| | | |
|---|---|---|
| JP | 2002-82172 A | 3/2002 |
| JP | 2008-96998 A | 4/2008 |
| JP | 2009-20099 A | 1/2009 |
| JP | 2011-247826 A | 12/2011 |

OTHER PUBLICATIONS

Japanese Office Action issued Jul. 1, 2015 for Japanese Application No. 2012-156378.

* cited by examiner

*Primary Examiner* — Hoon Song
(74) *Attorney, Agent, or Firm* — Birch, Stewart, Kolasch & Birch, LLP

(57) ABSTRACT

In an electronic cassette, an FPD and a support substrate are accommodated in a housing. A signal processing circuit for processing signals from the FPD is formed in a circuit board. The circuit board is attached to the back of the support substrate. The support substrate is a carbon plate made from carbon fiber reinforced plastic and exhibits anisotropy in bending strength depending on a fiber direction of carbon fiber. Spacers are provided inside a rear case that constitutes the housing. The spacers form a space, between the support substrate and the housing, to accommodate the circuit board. The spacers are arranged to suppress or prevent bending of the support substrate in a direction of weak bending strength.

6 Claims, 5 Drawing Sheets

ELECTRONIC CASSETTE

BACKGROUND OF THE INVENTION

1. Field of the Invention

The present invention relates to an electronic cassette used for radiation imaging.

2. Description Related to the Prior Art

Electronic cassettes are widely used in medical radiation imaging, for example, X-ray imaging. The electronic cassette comprises a portable thin box-shaped housing, a flat-panel detector (FPD) accommodated in the housing, and a circuit board. An indirect-conversion type FPD is composed of a scintillator and a sensor panel. The scintillator converts X-rays into visible light. The sensor panel has pixels arranged in two dimensions, and photoelectrically converts the visible light into a signal charge and stores it. A signal processing circuit, a communication circuit for external communication, and the like are formed in the circuit board. The signal processing circuit reads the signal charge from each pixel after the X-ray imaging and outputs the signal charge as X-ray image data. The circuit board is attached to a support substrate.

To perform the X-ray imaging, the electronic cassette may be set in a holder of an X-ray table, placed on a bed, or held by a patient. For example, to image an elderly patient at his/her home or an emergency patient at the site of an accident or a natural disaster, the electronic cassette is used outside of a hospital, without the X-ray table. Hence, it is necessary to reduce the weight of the electronic cassette to improve portability. It is also necessary to improve strength of the electronic cassette to prevent damage.

For example, an electronic cassette disclosed in Japanese Patent Laid-Open Publication No. 2011-247826 has reinforcement members attached to edges of a support substrate to reinforce the support substrate. The reinforcement members suppress deformation of the support substrate in a bending direction.

However, a problem arises from the use of the reinforcement members. The weight of the above-described electronic cassette is increased by the weight of the reinforcement members attached to the support substrate.

SUMMARY OF THE INVENTION

An object of the present invention is to provide an electronic cassette with reduced weight and improved strength.

To achieve the above and other objects, an electronic cassette of the present invention comprises a sensor panel, a circuit board, a support substrate, a housing, and at least one spacer. The sensor panel converts radiation, passed through a subject, into a radiation image. A signal processing circuit is formed in the circuit board. The signal processing circuit reads the radiation image. The support substrate is disposed behind the sensor panel in a radiation emission direction. The circuit board is attached to the support substrate. The housing accommodates the sensor panel and the support substrate. The at least one spacer is disposed between the support substrate and the housing. The spacer ensures a space for accommodating the circuit board. The spacer is disposed to suppress bending of the support substrate in a direction of weak bending strength.

It is preferable that the spacer has a long thin shape and is disposed such that a lengthwise direction of the spacer is in a direction to suppress the bending.

It is preferable that the support substrate includes a material made from carbon fiber reinforced plastic.

It is preferable that a direction to dispose the spacer is determined based on a fiber direction of carbon fiber in the carbon fiber reinforced plastic.

It is preferable that the carbon fiber reinforced plastic is a sheet-like prepreg made from the carbon fiber pre-impregnated with synthetic resin, and the support substrate is made up of a stack of the prepregs.

It is preferable that the spacer is disposed with its lengthwise direction orthogonal to the fiber direction of the carbon fiber.

It is preferable that the support substrate is made up of a stack of first and second prepregs. A fiber direction of the carbon fiber in the first prepreg is orthogonal to a fiber direction of the carbon fiber in the second prepreg. The spacer is disposed with its lengthwise direction orthogonal to the fiber direction of the outermost first prepreg of the stack.

It is preferable that the spacer is disposed close to the circuit board.

It is preferable that the circuit board has a rectangular shape, and the spacer is disposed in a lengthwise direction of the circuit board.

It is preferable that the spacers are disposed such that the circuit board is located between the spacers.

It is preferable that the spacer is provided integrally with the housing.

It is preferable that the housing has a size compliant with ISO 4090:2001.

According to the present invention, the spacer suppresses the bending of the support substrate in a direction in which the bending strength of the support substrate is weak. The spacer is a component necessary for ensuring a space, between the support substrate and the housing, to accommodate the circuit board. It is not necessary to add reinforcement members such as those disclosed in Japanese Patent Laid-Open Publication No. 2011-247826. The electronic cassette of the present invention has reduced weight as compared with that of the electronic cassette with the additional reinforcement members.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
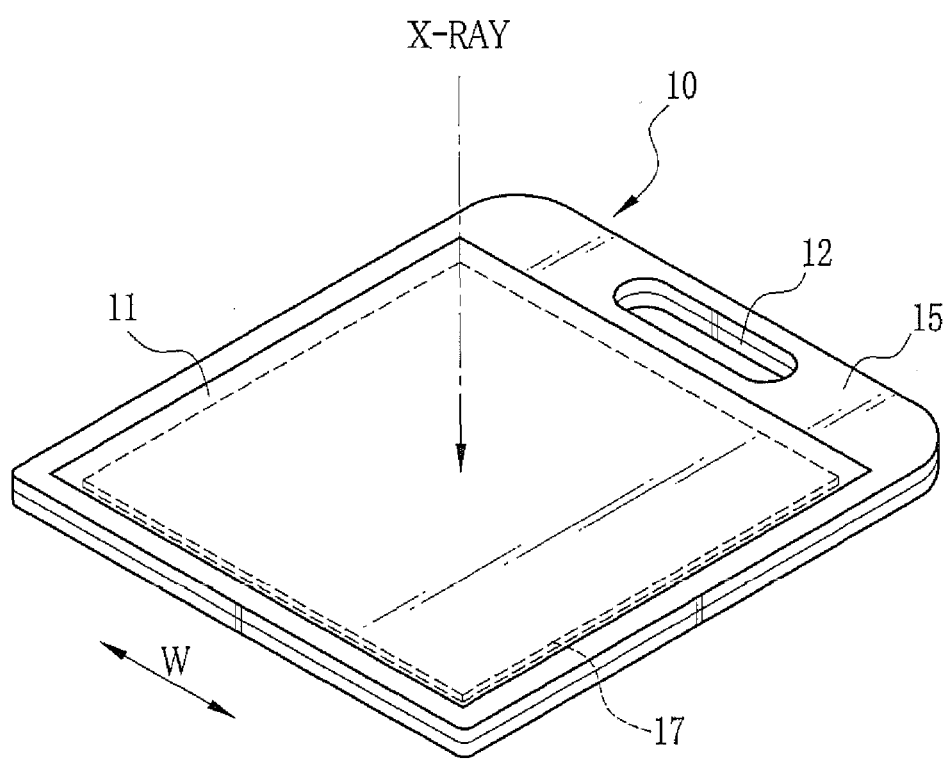
FIG. 1 is a perspective view illustrating an electronic cassette.

As shown in FIG. 1, an electronic cassette 10 has a thin, rectangular box-like shape. A square X-ray incident section 11 is provided on a top face of the electronic cassette 10 and close to one of shorter sides of the electronic cassette 10. X-rays are incident on the X-ray incident section 11. A grip 12 for holding or carrying the electronic cassette 10 is provided close to the other shorter side of the electronic cassette 10.

The grip 12 has an elongated hole with round ends. The electronic cassette 10 has an external size compliant with the international standard ISO 4090:2001 for film cassettes, IP cassettes, and CR cassettes.

To perform X-ray imaging, the electronic cassette 10 is detachably set into a holder of an X-ray table such that the X-ray incident section 11 faces an X-ray source that emits the X-rays. The X-ray table is of a standing type or a lying type. The X-ray imaging may be performed with the electronic cassette 10 placed on a bed under a patient's body, or held by a patient.

Figure 2:
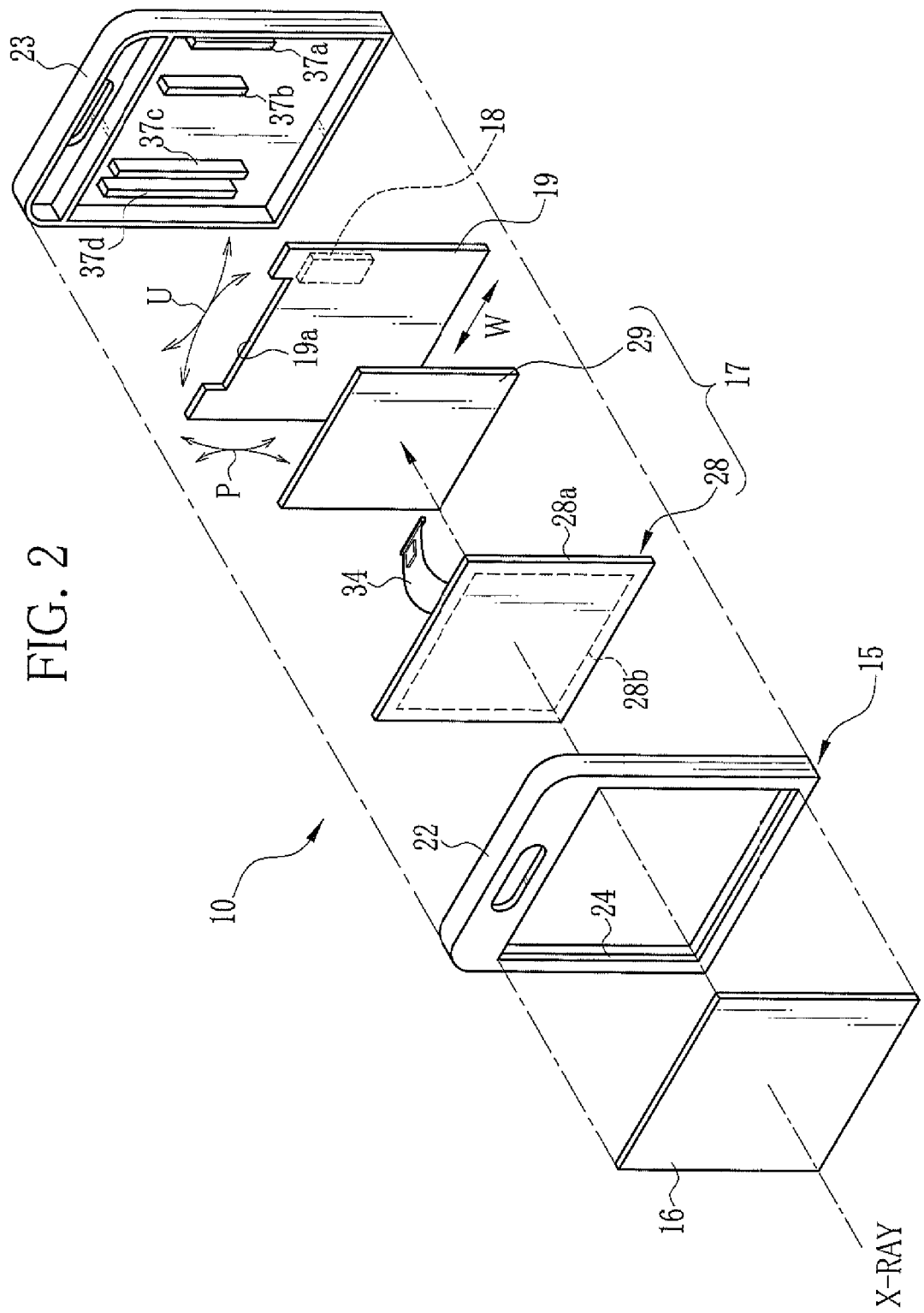
FIG. 2 is an exploded perspective view of the electronic cassette.
Figure 3:
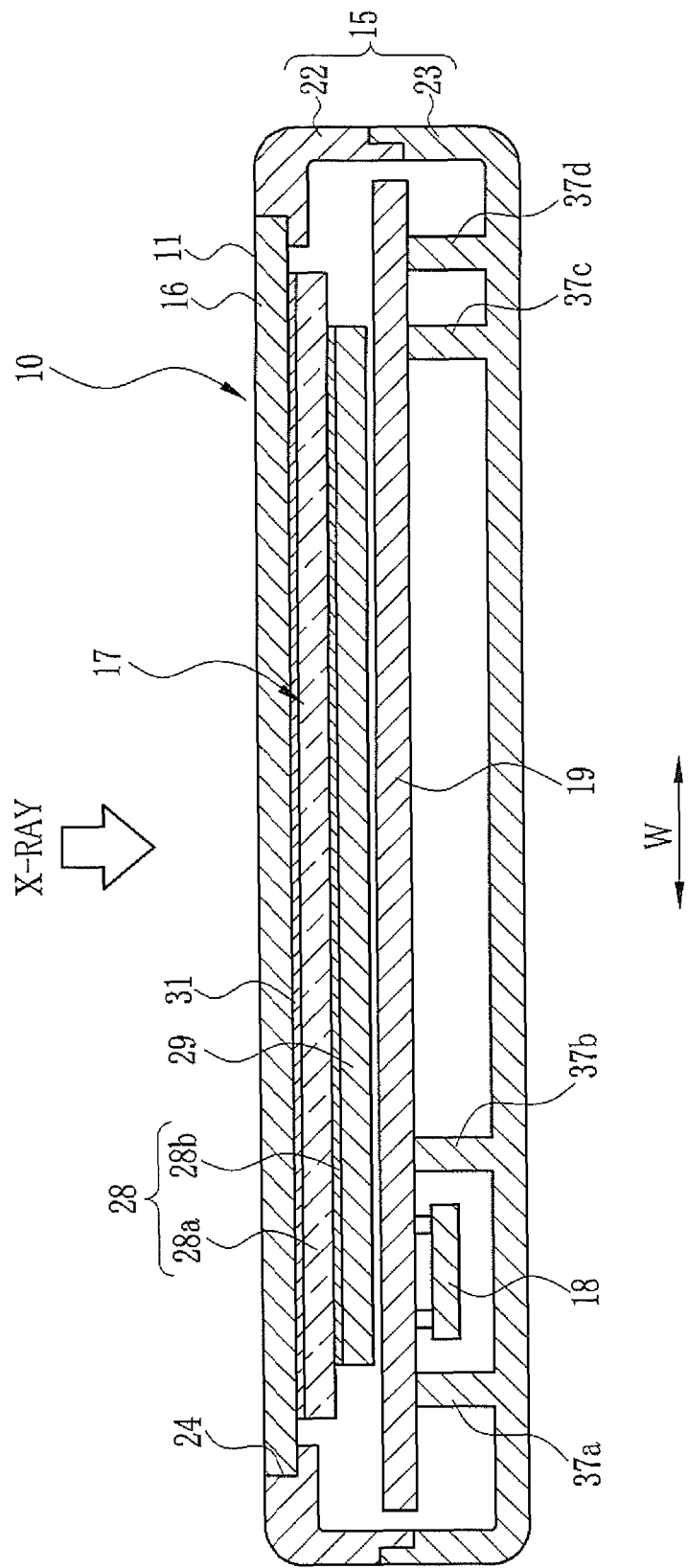
FIG. 3 is a cross-sectional view of the electronic cassette.

As shown in FIGS. 2 and 3, the electronic cassette 10 comprises a housing 15, an X-ray transmission plate 16, an FPD 17, and a support substrate 19. The housing 15 forms an external shape of the electronic cassette 10. The X-ray transmission plate 16 is attached to the front (top face) of the housing 15 to constitute the X-ray incident section 11. The FPD 17 produces an X-ray image based on the X-rays applied. A circuit board 18 is fixed to the support substrate 19. A signal processing circuit, a communication circuit for external communication, and the like are formed in the circuit board 18. The signal processing circuit reads the X-ray image from the FPD 17.

The housing 15 is composed of a front case 22 and a rear case 23 each having a flat box-like shape. The housing 15 accommodates the FPD 17 and the support substrate 19. The front case 22 forms the front half of the electronic cassette 10. The rear case 23 is assembled to the rear of the front case 22 and forms the rear half of the electronic cassette 10. A square opening 24 is formed through the front case 22. The X-ray transmission plate 16 is fitted into the opening 24 from the front of the front case 22. The X-ray transmission plate 16 is made from a lightweight but rigid carbon material with high X-ray transmission properties, for example. Each of the front and rear cases 22 and 23 is made from conductive resin, for example. The front and rear cases 22 and 23 also function as electromagnetic shields that block both incoming and outgoing electromagnetic noise to and from the electronic cassette 10.

The FPD 17 is an indirect conversion type and comprises a sensor panel (TFT active matrix substrate) 28 and a plate-like scintillator 29 attached to the back of the sensor panel 28. The scintillator 29 is composed of phosphor, for example, CsI:Tl (thallium doped cesium iodide) or GOS($Gd_2O_2S$:Tb, gadolinium oxysulfide). The scintillator 29 converts the emission X-rays transmitted through the sensor panel 28 into visible light.

The sensor panel 28 comprises, for example, a glass substrate 28a and a photoelectric conversion layer 28b provided over the glass substrate 28a. The photoelectric conversion layer 28b is located on the scintillator 29 side. The photoelectric conversion layer 28b is provided with a plurality of pixels arranged in matrix. Each pixel comprises a photodiode, a capacitor, and a thin-film transistor (TFT). The photodiode produces signal charge in accordance with the visible light incident from the scintillator. The capacitor stores the signal charge produced in the photodiode. The TFT reads the charge from the capacitor.

In the FPD 17, the glass substrate 28a of the sensor panel 28 is adhered and fixed to the back of the X-ray transmission plate 16 with a double-sided tape 31 or an adhesive so as to reduce the thickness of the electronic cassette 10.

The circuit board 18 has a rectangular shape, for example. The circuit board 18 is placed close to one of sides of the electronic cassette 10. A longitudinal direction of the circuit board 18 is placed along a longitudinal direction of the electronic cassette 10. The photoelectric conversion layer 28b of the sensor panel 28 and the circuit board 18 are connected via a flexible cable 34.

The support substrate 19 is a substantially square plate-like component. The support substrate 19 is fixed inside the rear case 23 with a screw or the like. The support substrate 19 has a cutout 19a that provides a gap. The flexible cable 34 connecting the sensor panel 28 to the circuit board 18 runs through the gap. The support substrate 19 is disposed behind the sensor panel 28 in an emission direction of the X-rays.

Each of long pillar-like spacers 37a to 37d is provided inside the rear case 23 and integrally with the rear case 23. The spacers 37a to 37d form a space, between the support substrate 19 and the rear case 23, to accommodate the circuit board 18.

The support substrate 19 supports the circuit board 18. The support substrate 19 also functions as a reinforcing plate which improves strength of the electronic cassette 10 in a bending direction. The support substrate 19 is composed of a carbon plate made from carbon fiber reinforced plastic, for example. The carbon plate is light-weight and has extremely high rigidity. Hence, the carbon plate provides both the weight reduction and the high rigidity required for the electronic cassette 10.

Figure 4:
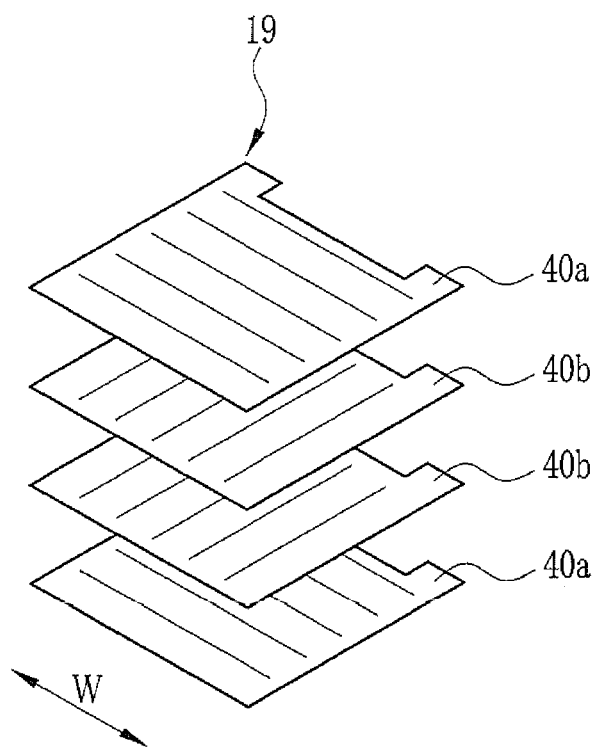
FIG. 4 is an explanatory view illustrating a support substrate.

As shown in FIG. 4, the support substrate 19 is a carbon plate produced by hardening a stack of first and second prepregs 40a and 40b. A fiber direction of carbon fiber in the first prepreg 40a is orthogonal to that in the second prepreg 40b. Hereinafter, a fiber direction of carbon fiber is simply referred to as the carbon fiber direction. Each of the prepregs 40a and 40b is a sheet material made from carbon fiber pre-impregnated with matrix resin, for example epoxy resin, being a base material. Each of the prepregs 40a and 40b has a square shape with the size substantially the same as the plane size of the support substrate 19. The prepregs 40a and 40b are integrated using a heating and pressurizing method, fusion, adhesion, or the like. Note that, in FIG. 4, four prepregs are used by way of example. The number of prepregs may be greater than or less than four.

In the support substrate 19, the first and second prepregs 40a and 40b are stacked such that the carbon fiber direction of the outermost first prepregs 40a is orthogonal to that of the second prepregs 40b stacked between the outermost first prepregs 40a. The support substrate 19 is attached to the rear case 23 such that the carbon fiber direction of the outermost first prepregs 40a is in W direction (see FIGS. 2 and 5) that is the width direction of the electronic cassette 10.

It is known that the carbon plate made up of a stack of prepregs exhibits anisotropy in bending strength depending on how the prepregs are stacked. Generally, the anisotropy in bending strength is greatly affected by the carbon fiber direction of the outermost prepreg. For example, when the carbon fiber direction of the outermost first prepreg 40a is in the W direction (the width direction of the electronic cassette 10), the support substrate 19 has high strength in a bending direction U (see FIG. 2) orthogonal (including substantially orthogonal) to the W direction of the electronic cassette 10. However, the bending strength of the electronic cassette 10 in a bending direction P (see FIG. 2), parallel (including substantially parallel) with the W direction, is weaker than that in the bending direction U. This anisotropy in the bending strength of the support substrate 19 affects the bending strength of the electronic cassette 10.

Figure 5:
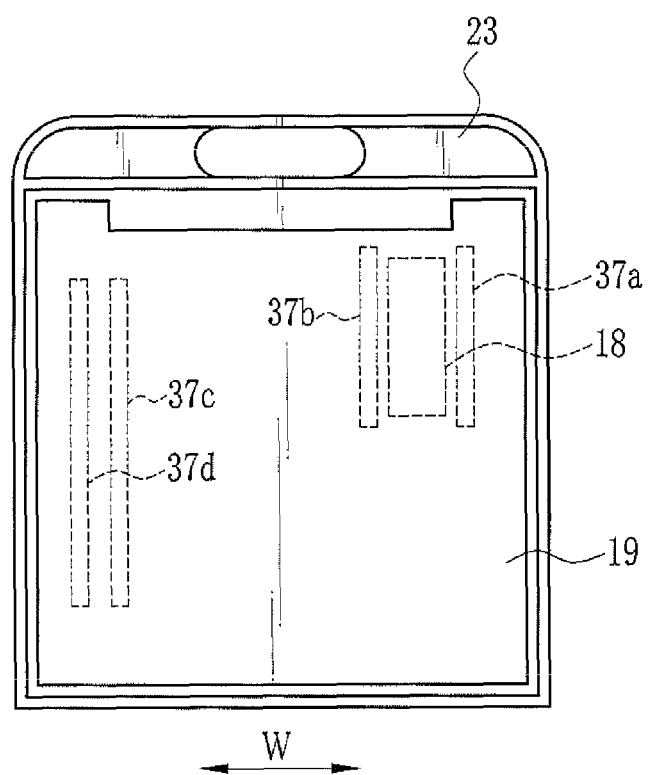
FIG. 5 is a front view of a rear case to which the support substrate is attached.

In this embodiment, an arrangement of the spacers 37a to 37d is devised to reinforce the bending strength of the support substrate 19 in the bending direction P. To be more specific, as shown in FIG. 5, each of the spacers 37a to 37d is disposed with its lengthwise direction orthogonal (including substantially orthogonal) to the W direction, being the carbon fiber direction of the first prepreg 40a of the support substrate 19. Thereby, the spacers 37a to 37d prevent deformation of the support substrate 19 in the bending direction P. Thus, the strength of the electronic cassette 10 is improved. The spacers 37a to 37d are indispensable in a configuration in which the circuit board 18 is attached to the back of the support substrate 19. Only position(s) or direction(s) of the spacers 37a to 37d are changed. The conventional reinforcement members are not necessary, so that the weight of the electronic cassette 10 does not increase. Merits, such as the weight reduction and the high rigidity, of using the carbon plate as the support substrate 19 are maintained.

In this embodiment, to prevent damage to the circuit board 18 due to deformation of the electronic cassette 10, the spacers 37a and 37b are arranged close to the circuit board 18, namely, the circuit board 18 is located between the spacers 37a and 37b. Because the circuit board 18 is an electrical component, it is highly necessary to protect it from mechanical stress that causes failure. By placing the spacers 37a and 37b close to the circuit board 18, the strength of the support substrate 19 around the circuit board 18 increases. Thereby, the circuit board 18 is securely protected from the mechanical stress.

In this embodiment, the circuit board 18 has a rectangular shape. The spacers 37a and 37b are arranged such that the lengthwise direction of the spacers 37a and 37b is parallel (including substantially parallel) with that of the circuit board 18. In the rectangular circuit board 18, the bending strength in the lengthwise direction is weaker than that in the widthwise direction. By arranging the spacers 37a and 37b as described in this embodiment, the relatively weak bending strength of the circuit board 18 in the lengthwise direction is reinforced. The spacers 37c and 37d are disposed on the opposite side of the spacer 37a. Thereby, the support substrate 19 is reinforced with excellent balance.

As described above, additional reinforcement members are not used in this embodiment, so that the weight and the parts cost of the electronic cassette 10 do not increase. The manufacturing cost of the electronic cassette 10 of the present invention is reduced as compared with that of the electronic cassette with the additional reinforcement members. The weight of the electronic cassette 10 of the present invention is reduced by the weight of the additional reinforcement members. As a result, usability such as portability is improved. The bending strength inside the electronic cassette is adjusted by changing the shapes and arrangements of the spacers. Hence, restrictions on strength of the internal components accommodated in the housing 15 of the electronic cassette 10 are reduced to a certain extent. Thus, it is not necessary to design the internal parts of the electronic cassette 10 with increased strength, or to add reinforcement members.

In the above embodiment, each of the spacers 37a to 37d is provided integrally with the rear case 23. Alternatively, the spacers may be provided separately from the rear case 23 and attached to the support substrate 19 or the rear case 23. The spacers may be provided integrally with the support substrate 19. The arrangements and the number of the spacers are not limited to the above embodiment and changed as necessary in accordance with the number, the size, and an arrangement of the circuit board(s), for example.

In the above embodiments, the support substrate 19 is composed only of the carbon plate. The present invention is also applicable to a support substrate made up of a stack of a carbon plate and a metal plate such as an aluminum plate. Even so, the strength of the electronic cassette 10 is affected by the anisotropy in bending strength of the carbon plate. The present invention is also applicable to an electronic cassette using a support substrate made from a material other than the carbon plate. A rectangular support substrate exhibits anisotropy in bending strength between the lengthwise direction and the widthwise direction. In this case, the spacers are arranged to prevent or suppress bending in the direction of the weak bending strength. Thereby, the bending strength of the electronic cassette is improved.

In the above embodiments, the spacers 37a to 37d are arranged orthogonal (including substantially orthogonal) to the carbon fiber direction of the first prepreg 40a such that the bending of the support substrate 19 in the direction of the weak bending strength is suppressed. Alternatively, one or some of the spacers 37a to 37d may be arranged in the carbon fiber direction of the first prepreg 40a. In addition to the spacers 37a to 37d, another spacer(s) may be arranged in the carbon fiber direction. In the above embodiments, each of the spacers 37a to 37d has the shape of the long straight pillar by way of example. The spacer may have an L-shape with a part extending in a direction other than the lengthwise direction, for example, in a direction orthogonal (including substantially orthogonal) to the lengthwise direction. The spacer may have any shape as long as it is substantially long and thin. In this case, one or some of the spacers or a part of the spacer may function to reinforce the support substrate 19 in the direction of strong bending strength. This does not cause a problem as long as the spacers ensure the required strength of the support substrate 19 in the direction of the weak strength.

In this embodiment, the spacers 37a to 37d are arranged to suppress or prevent the bending of the support substrate 19 in the direction of the weak bending strength. In this technical idea, the support substrate 19 and the spacers 37a to 37d work together to reinforce the bending strength of the housing 15 of the electronic cassette 10. The support substrate 19 reinforces the bending strength in one direction and the spacers 37a to 37d reinforce the bending strength in the other direction(s). In this configuration, the number of the spacers is reduced in the direction in which the support substrate 19 reinforces the bending strength, as compared with that in the case where only the spacers are used to reinforce the bending strength in all directions. Reduction in the number of spacers creates an additional space in the housing. This increases flexibility in parts size, designing, and arrangements of components. A compact and thin housing is produced by eliminating the extra spaces.

In the above embodiment, the direction of arrangement of the spacers 37a to 37d is determined based on the carbon fiber direction of the outermost first prepreg 40a of the support substrate 19. Depending on the way how the prepregs are stacked, the direction of the weak bending strength cannot not be determined only from the carbon fiber direction of the outermost first prepreg 40a of the support substrate 19. Hence, the direction of arrangement of the spacers 37a to 37d cannot be determined. In this case, it is preferable to actually measure the bending strength of the support substrate 19 and determine the direction of arrangement of the spacers 37a to 37d based on the result of the measurement. The direction of arrangement of the spacers 37a to 37d is determined so as to suppress or prevent the bending of the support substrate in the direction of the weak bending strength.

In the above embodiments, the support substrate 19 made up of the prepregs 40a and 40b stacked with their carbon fiber directions orthogonal to each other is described by way of example. The present invention is also applicable to a support substrate with all prepregs stacked in the same carbon fiber direction. In this case, the spacers 37a to 37d are disposed such that the lengthwise direction of the spacers 37a to 37d is orthogonal (including substantially orthogonal) to the carbon fiber direction.

The above embodiment employs an ISS (Irradiation Side Sampling) method using the sensor panel 28 and the scintillator 29 arranged in this order in the direction of X-ray incidence. Alternatively, the present invention employs a PSS (Penetration Side Sampling) method using the scintillator and the sensor panel arranged in this order in the direction of X-ray incidence. The present invention is also applicable to an electronic cassette using a direct conversion type FPD with no scintillator. The direct conversion type FPD uses a conversion layer (amorphous selenium or the like) to convert the X-rays directly into a charge.

The present invention is applicable to an electronic cassette using radiation other than X-rays, for example, gamma rays.

What is claimed is:

1. An electronic cassette comprising:
   a sensor panel for converting radiation, passed through a subject, into a radiation image;
   a circuit board in which a signal processing circuit is formed, the signal processing circuit reading the radiation image;
   a support substrate disposed behind the sensor panel in a radiation emission direction, the circuit board being attached to the support substrate;
   a housing for accommodating the sensor panel and the support substrate; and
   at least one spacer disposed between the support substrate and the housing, the spacer ensuring a space for accommodating the circuit board, the spacer being disposed to suppress bending of the support substrate in a direction of weak bending strength, wherein
   the spacer has a long thin shape and is disposed such that a lengthwise direction of the spacer is in a direction to suppress the bending,
   the support substrate includes a material made from carbon fiber reinforced plastic,
   a direction to dispose the spacer is determined based on a fiber direction of carbon fiber in the carbon fiber reinforced plastic,
   the carbon fiber reinforced plastic is a sheet-like prepreg made from the carbon fiber pre-impregnated with synthetic resin, and the support substrate is made up of a stack of the prepregs,
   the spacer is disposed with the lengthwise direction orthogonal to the fiber direction of the carbon fiber, and
   the support substrate is made up of a stack of first and second prepregs, and a fiber direction of the carbon fiber in the first prepreg is orthogonal to a fiber direction of the carbon fiber in the second prepreg, and the spacer is disposed with the lengthwise directional orthogonal to the fiber direction of the outermost first prepreg of the stack.

2. The electronic cassette of claim 1, wherein the spacer is disposed close to the circuit board.

3. The electronic cassette of claim 2, wherein the circuit board has a rectangular shape, and the spacer is disposed in a lengthwise direction of the circuit board.

4. The electronic cassette of claim 2, wherein the spacers are disposed such that the circuit board is located between the spacers.

5. The electronic cassette of claim 1, wherein the spacer is provided integrally with the housing.

6. The electronic cassette of claim 1, wherein the housing has a size compliant with ISO 4090:2001.

* * * * *